United States Patent
Kang

(10) Patent No.: US 9,883,058 B2
(45) Date of Patent: Jan. 30, 2018

(54) METHOD OF CONTROLLING POP-UPS, IMAGE FORMING APPARATUS, AND USER TERMINAL USING THE SAME

(71) Applicant: S-PRINTING SOLUTION CO., LTD., Suwon-si (KR)

(72) Inventor: Soo-young Kang, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 119 days.

(21) Appl. No.: 14/504,885

(22) Filed: Oct. 2, 2014

(65) Prior Publication Data

US 2015/0100921 A1 Apr. 9, 2015

(30) Foreign Application Priority Data

Oct. 4, 2013 (KR) .................. 10-2013-0118723

(51) Int. Cl.
| | | |
|---|---|---|
| *G06F 3/048* | (2013.01) | |
| *H04N 1/00* | (2006.01) | |
| *G06F 3/12* | (2006.01) | |
| *H04M 1/725* | (2006.01) | |

(52) U.S. Cl.
CPC ....... *H04N 1/00413* (2013.01); *G06F 3/1207* (2013.01); *G06F 3/1229* (2013.01); *G06F 3/1292* (2013.01); *H04N 1/00307* (2013.01); *H04N 1/00411* (2013.01); *H04N 1/00424* (2013.01); *H04N 1/00472* (2013.01); *H04M 1/72533* (2013.01); *H04N 2201/006* (2013.01); *H04N 2201/0055* (2013.01); *H04N 2201/0075* (2013.01); *H04N 2201/0094* (2013.01)

(58) Field of Classification Search
CPC ....... G06F 3/0481; H04N 1/00; H04N 1/0035
See application file for complete search history.

(56) References Cited

U.S. PATENT DOCUMENTS

| | | | | |
|---|---|---|---|---|
| 5,297,286 A | * | 3/1994 | Uehara | G09G 5/14 713/1 |
| 6,728,349 B2 | * | 4/2004 | Chang | H04M 1/575 379/142.01 |
| 6,734,985 B1 | * | 5/2004 | Ochiai | G06F 3/1285 358/1.14 |
| 6,889,063 B2 | * | 5/2005 | Yamada | H04M 1/72519 340/7.39 |
| 7,257,777 B1 | * | 8/2007 | Kanevsky | G06F 9/4443 715/790 |
| 2006/0080571 A1 | * | 4/2006 | Ichinowatari | G06F 11/328 714/4.1 |
| 2010/0079300 A1 | * | 4/2010 | Agata | G06F 11/0784 340/635 |
| 2012/0081729 A1 | | 4/2012 | Kang et al. | |

FOREIGN PATENT DOCUMENTS

EP 2437479 4/2012

* cited by examiner

*Primary Examiner* — Dino Kujundzic
(74) *Attorney, Agent, or Firm* — Staas & Halsey LLP

(57) ABSTRACT

Provided are methods of controlling a pop-up, and image forming apparatuses and user terminals that use the control methods. Although an interruption occurs in a user terminal that is able to communicate with the image forming apparatus while an operation is performed in the image forming apparatus, the method may control the interruption without an error.

6 Claims, 9 Drawing Sheets

METHOD OF CONTROLLING POP-UPS, IMAGE FORMING APPARATUS, AND USER TERMINAL USING THE SAME

CROSS-REFERENCE TO RELATED APPLICATIONS

This application claims the priority benefit of Korean Patent Application No. 10-2013-0118723, filed on Oct. 4, 2013, in the Korean Intellectual Property Office, the disclosure of which is incorporated herein in its entirety by reference.

BACKGROUND

1. Field

One or more embodiments relate to methods of controlling pop-ups, and image forming apparatuses and user terminals using the same.

2. Description of the Related Art

A user interface (UI) is included in various image forming apparatuses, such as printers, copiers, fax machines, and complexifiers (e.g., a multi function peripheral or multi-function printer), to control operation or input user data. The UI of an image forming apparatus provides user convenience in terms of controlling an operation of the image forming apparatus. As technology develops, hardware and software that are used in an image forming apparatus have also greatly developed, and the UI of the image forming apparatus also has progressed.

Recently, as the use of smart devices increases, software that can control the operation of an image forming apparatus is installed on a user terminal, such as a smartphone.

SUMMARY

One or more embodiments include methods of controlling pop-ups generated in a process of performing an operation in an image forming apparatus without an error even though an interruption occurs in a user terminal that can communicate with the image forming apparatus, and image forming apparatuses and user terminals using the method.

According to one or more embodiments, there is provided a method of controlling a pop-up by using a user terminal that is able to communicate with an image forming apparatus which includes: receiving a request of displaying the pop-up for an event detected in the image forming apparatus; displaying the pop-up corresponding to the detected event; and maintaining the pop-up when an interruption occurs in the user terminal while displaying the pop-up.

According to one or more embodiments, there is provided a user terminal that is able to communicate with an image forming apparatus, the user terminal includes: a communication interface through which a request to display a pop-up for an event detected in the image forming apparatus is received; a user interface on which the pop-up corresponding to the detected event is displayed; and a processor that maintains the pop-up when an interruption occurs in the user terminal while displaying the pop-up.

According to one or more embodiments, there is provided an image forming apparatus that is able to communicate with a user terminal, the image forming apparatus includes: a control unit that detects an event that occurs while performing an operation in the image forming apparatus, and requests the user terminal and a user interface device to display a pop-up corresponding to the detected event; and the user interface device that displays the pop-up corresponding to the detected event, wherein the image forming apparatus maintains the pop-up by renewing a measured time elapse to a predetermined set time at which the pop-up is forcedly closed when an interruption occurs in the user terminal while displaying the pop-up.

In an aspect of one or more embodiments, there is provided at least one non-transitory computer readable medium storing computer readable instructions which when executed implement methods of one or more embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Reference will now be made in detail to embodiments, examples of which are illustrated in the accompanying drawings.

It will be understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms "first", "second", etc. may be used herein to describe various elements, the constituent elements should not be limited by these terms. These terms are only used to distinguish one constituent element from another constituent element.

Embodiments are related to methods of controlling a pop-up, image forming apparatuses, and user terminals that use the pop-up control method, and detail descriptions of technology that are well known to those of ordinary skill in the art in which embodiments belong will be omitted.

Figure 1:
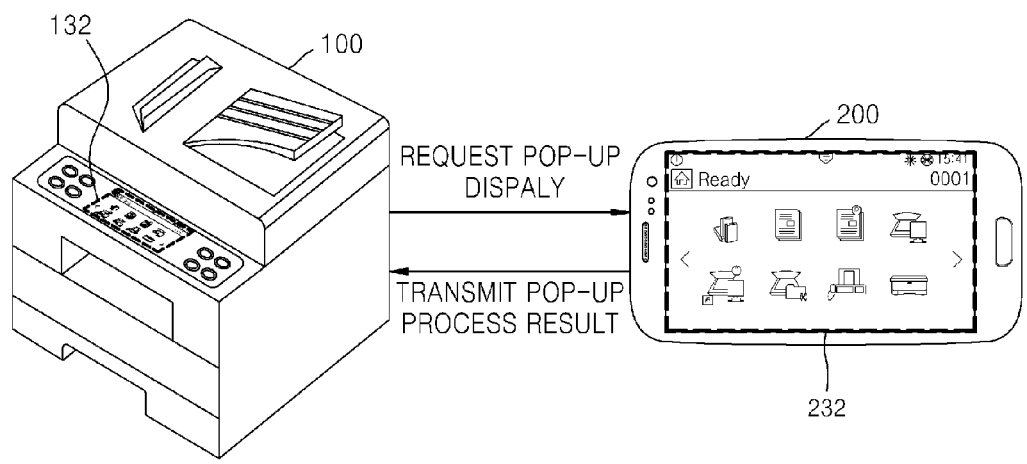
FIG. 1 is a drawing for explaining a process of transmitting a pop-up display request and a pop-up process result between an image forming apparatus and a user terminal according to an embodiment.

FIG. 1 is a drawing for explaining a process of transmitting a pop-up display request and a pop-up process result between an image forming apparatus 100 and a user terminal 200, according to an embodiment. The image forming apparatus 100 is an apparatus, such as a printer, a copier, a scanner, a multifunction device, or a complexifier (e.g., a multi function peripheral or multi-function printer) that can form an image data on a printing paper. The user terminal 200 may be a device that can communicate with the image forming apparatus 100, such as a mobile phone. Examples of other devices to which an apparatus and/or method of an embodiment may be applied include a smartphone, personal digital assistant (PDA), portable media player (PMP), digital camera, a laptop computer, notebook computer, tablet, portable game player, and wearable device. Further, it is understood that apparatuses and/or methods are also applicable to any device with which an apparatus or method of an embodiment can be used. However, a user terminal 200 is shown and used as an example of a device to which an apparatus and/or according to an embodiment can be applied.

The image forming apparatus 100 may communicate with the user terminal 200 via a wire or wirelessly. The image forming apparatus 100 may simultaneously or sequentially communicate with a plurality of user terminals 200. Data related to operations performed in the image forming apparatus 100 may be transmitted and received between the image forming apparatus 100 and the user terminal 200. For example, the user terminal 200 may request for an operation that may be performed in the image forming apparatus 100, or a processing state of an operation that is performed in the image forming apparatus 100 may be transmitted to the user terminal 200.

A user interface screen that is displayed on a user interface unit (user interface) 132 of the image forming apparatus 100 may be the same as a user interface screen displayed on a user interface unit (user interface) 232 of the user terminal 200. That is, the same user interface screen, in which the type and shape of a menu that shows applications, functions, and options that may be performed in the image forming apparatus 100 are displayed, may be displayed on the user terminal 200. The same user interface screen as that of the image forming apparatus 100 may be used in the user terminal 200, and thus, an operational convenience may be provided to the user who is accustomed to using the image forming apparatus 100. In particular, if the user is at a location where the user may not physically reach the image forming apparatus 100 but at a location the user may communicate with the image forming apparatus 100, the user may operate the image forming apparatus 100 by using the user terminal 200 through a user interface screen that is the same as the user interface screen displayed on the user interface unit 132 of the image forming apparatus 100. Hereinafter, a configuration of the image forming apparatus 100 that may communicate with the user terminal 200 will be described with reference to FIG. 2.

A user interface screen may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not so limited thereto and may include other types of user interface screens (displays).

The user terminal 200 and the image forming apparatus 100 may include a plurality of connectors such as USB 2.0, USB 3.0, HDMI, IEEE 1394, or the like, to be connected to various types of input devices or user interfaces by a wired connection. Alternatively, or in addition to a wired connection, the user terminal 200 and image forming apparatus 100 may be connected to various types of input devices or user interfaces via a wireless connection. The wireless connection may be performed using various types of wireless networks, for example via BLUETOOTH®, WI-FI Direct®, or WI-FI®, or via a remote control device such as by using an infrared remote control, for example.

Figure 2:
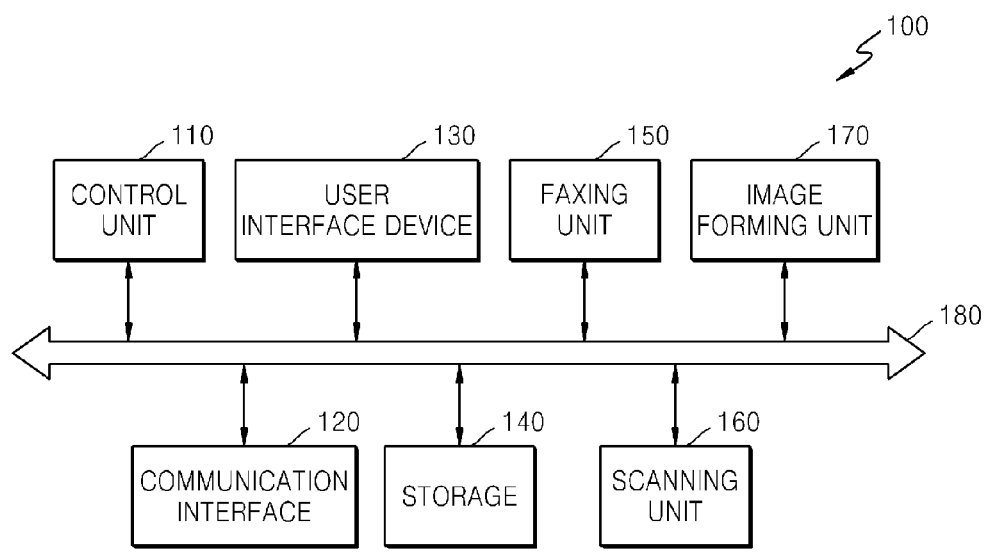
FIG. 2 is a block diagram of a configuration of the image forming apparatus according to an embodiment.

FIG. 2 is a block diagram of a configuration of the image forming apparatus 100 according to an embodiment. Referring to FIG. 2, the image forming apparatus 100 includes a control unit (controller) 110, a communication interface 120, a user interface device (user interface) 130, a storage 140, a faxing unit 150, a scanning unit (scanner) 160, and an image forming unit (image former) 170. The constituent elements described above transmit and receive various data via a data bus 180. It will be understood by those of ordinary skill in the art that the image forming apparatus 100 may further include other general constituent elements than the constituent elements described in FIG. 2.

The control unit 110 controls overall functions of the image forming apparatus 100, and may be a microprocessor. At this point, the control unit 110 may be divided into a plurality of process modules that are separated according to their function and a main process module that controls the process modules. The control unit 110 may receive data from an external device or transmit data to the external device through the communication interface 120. Also, the control unit 110 reads information inputted from the user through the user interface device 130 and outputs a process result processed according to the control of the control unit 110 through the user interface device 130. Also, the control unit 110 controls the storage 140 to store various programs and data or to load various programs and data stored in the storage 140. Also, the control unit 110 controls an operation of the fax machine unit 150 to transmit and receive facsimiles, or controls an operation of the scanning unit 160 to scan a document. The control unit 110 compares data loaded from the storage 140 with data processed in the control unit 110, or controls data stored in the storage 140 to be transmitted to the image forming unit 170.

The communication interface 120 may include a network module for connecting to a network system, a modem to be used for transmitting and receiving facsimiles, and a USB host module for forming a data transfer channel with mobile storage media according to an application and function of the image forming apparatus 100. At this point, an external device may be a device connected to the image forming apparatus 100 via a wire or wirelessly, and may be the user terminal 200, such as a laptop or a smartphone. The image forming apparatus 100 may exchange data related to an operation performed in the image forming apparatus 100 with the user terminal 200 via the communication interface 120.

The user interface device 130 displays information to the user, and acquires an input signal from the user. The user interface device 130 may have an independent processor formed of a plurality of processors to process various operations that are processed in the user interface device 130, and may have an independent operating system for providing an optimum user interface. The user interface device 130 may include a memory that stores an operating system, various programs, and data. The user interface device 130 may include the user interface unit 132, such as a static or piezo touch screen. The user interface device 130 may receive various inputs related to the use of the image forming apparatus 100 from the user, and may transmit data related to the input of the user to the control unit 110 that controls the image forming apparatus 100 via the data bus 180. The user interface device 130 may output information related to an operation performed in the image forming apparatus 100 to the user interface unit 132 by configuring a user interface screen so that the user can see the user interface screen. The user interface device 130 may exchange data with other constituent elements that constitute the image forming apparatus 100 through the data bus 180.

The storage 140 stores all programs and data generated according to the operation of the image forming apparatus 100 and used when the image forming apparatus 100 is operated. For example, the storage 140 stores data received from an external device, data inputted through the user interface device 130, data, such as facsimile, scanning, and copy data that are generated by the operation of the image forming apparatus 100, and various programs used for controlling the image forming apparatus 100.

The faxing unit 150 transmits or receives facsimiles through a modem. The fax machine unit 150 transforms image data recorded in a document to facsimile data to be appropriate for transmitting through the modem, or transmits facsimile data received from an external device to the image forming unit 170 to be printed on a printing medium, such as printing paper.

The scanning unit 160 generates scan data by scanning image data recorded on a document, and transmits the scan data to the communication interface 120 for connecting to a network system, to the storage 140 for storing, to the fax machine unit 150 for transmitting a facsimile, or to the image forming unit 170 for printing. That is, the scanning unit 160 may perform functions, such as SCAN to Server Message Block (SMB), SCAN to File Transfer Protocol (FTP), SCAN to Web Distributed Authoring and Versioning (WebDAV), SCAN to E-mail, SCAN TO PC, or SCAN TO BOX.

The image forming unit 170 forms an image, and performs an operation of outputting the image on a printing medium, such as printing paper, by generating copy and printing data. The image forming unit 170 may include hardware units that perform charging, exposing, developing, transferring, and fixing of the copy and printing data and a software module for driving the hardware units.

Referring still to FIG. 1, it is understood that the image forming apparatus 100 exchanges data with a single user terminal 200. The image forming apparatus 100 may communicate with a plurality of different user terminals. However, in FIG. 1, for convenience of explanation, it is depicted that the image forming apparatus 100 communicates only with one user terminal 200.

As depicted in FIG. 1, the image forming apparatus 100 may request the user terminal 200 to display a pop-up related to an operation performed in the image forming apparatus 100. For example, when a printing operation command is transmitted to the image forming apparatus 100 from the user terminal 200, the image forming apparatus 100 may request the user terminal 200 to display a pop-up related to the printing operation by detecting an event that can occur during the printing operation, and transmitting the information related to the detected event to the user terminal 200.

The user terminal 200 may display a pop-up to the user according to the pop-up display request by the image forming apparatus 100. The user terminal 200 may receive a pop-up input from the user and transmit a result of processing the pop-up to the image forming apparatus 100 that requests the pop-up display.

A user interface screen that is displayed on the user interface unit 232 of the user terminal 200 is the same as the user interface unit 132 displayed on the image forming apparatus 100, and thus, the user may have the same user interface experience by using either the user interface unit 132 of the image forming apparatus 100 or the user interface unit 232 of the user terminal 200. Accordingly, not only a menu that is displayed on the user interface unit 132 of the image forming apparatus 100, wherein the menu shows applications, functions, and options that may be performed in the image forming apparatus 100, but also a pop-up that may be displayed on the user interface unit 132 of the image forming apparatus 100 may be displayed in the same type and shape on the user interface unit 232 of the user terminal 200.

Figure 3:
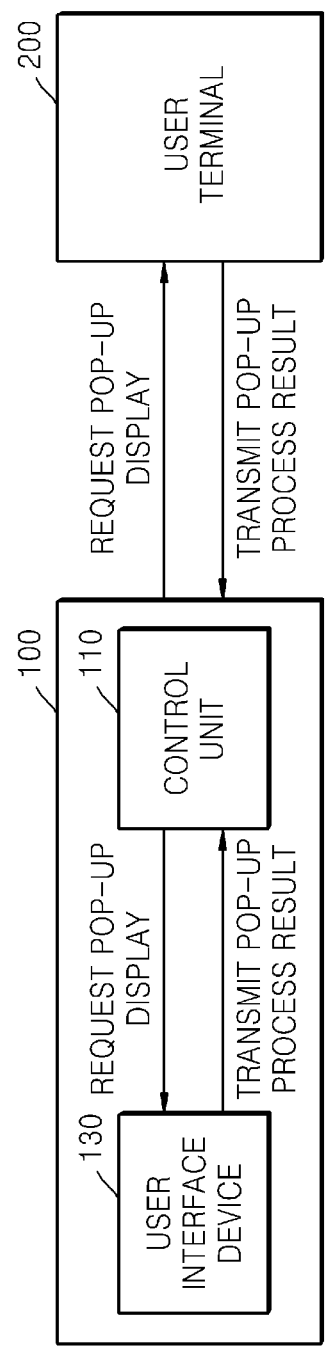
FIG. 3 is a block diagram of the image forming apparatus and a user terminal that controls the transmission of a pop-up display request and a pop-up process result.

FIG. 3 is a block diagram of the image forming apparatus 100 and the user terminal 200 that controls the transmission of a pop-up display request and a pop-up process result. In FIG. 3, for convenience of explanation, a configuration for controlling a pop-up is only depicted. However, it is understood by those of ordinary skill in the art that the image forming apparatus 100 and the user terminal 200 may further include constituent elements other than the constituent elements depicted in FIG. 3.

The control unit 110 of the image forming apparatus 100 performs an overall control of the image forming apparatus 100, that is, controls various types of operations that may be performed in the image forming apparatus 100. The control unit 110 may include an event handler module that detects various events that may occur during operations of the image forming apparatus 100. Examples of events that may occur during operations of the image forming apparatus 100 and may be detected by the event handler module of the control unit 110 of the image forming apparatus 100 may include: a situation where a paper tray that stores papers is designated; a situation where a size of paper is not right while performing a requested operation; a situation where paper ran out; a situation where paper jammed while performing a requested operation; and a situation where a facsimile is received. There are pop-ups corresponding to such events for processing the events. For example, the pop-ups may be: a tray confirmation pop-up that is generated to designate paper in a tray that stores paper; a paper-mismatch pop-up that is generated when the size of paper is not right while performing a requested operation; a paper empty pop-up that is generated when the paper in the tray ran out; a jam recovery pop-up that is generated to notify a jam state while performing a requested operation; and a caller ID pop-up that notifies a reception of a facsimile. A pop-up list for confirming pop-ups corresponding to the events generated in the image forming apparatus 100 may be stored in the image forming apparatus 100 and the user terminal 200 in advance.

The control unit 110 may request the user interface device 130 and the user terminal 200 to display pop-ups related to generated events in order to detect and to process the generated events. The control unit 110 may request the user terminals 200 that are currently connected to the image forming apparatus 100 of the plural user terminals 200 that are able to communicate with the image forming apparatus 100, or the user terminal 200 that is set to receive data transmitted from the image forming apparatus 100 to display the pop-ups. Also, the control unit 110 may determine the user terminal 200 of the user terminals 200 to display the pop-up according to the kind of pop-ups. For example, the control unit 110 may determine a user terminal 200 that recently has requested and performed an operation related to the pop-up to be displayed and a user terminal 200 that currently displays an operational image related to the pop-up to be displayed on a user interface as the user terminals 200 to display the pop-up.

When the control unit 110 requests the user interface device 130 to display a pop-up corresponding to an event that occurred during an operation in the image forming apparatus 100, a pop-up handler module of the user interface device 130 confirms the requested pop-up by using a pop-up list stored in a memory, and a user interface (UI) screen configuration module generates a pop-up to be displayed on the user interface screen and transmits the pop-up to the user interface unit 132. A UI input determination module in a processor of the user interface device 130 determines a result of processing the pop-up by discriminating content inputted by the user with respect to the user interface screen displayed on the user interface unit 132. The result of processing the pop-up is transmitted to the control unit 110 through the data bus 180, and the control unit 110 processes the operation that is currently performed on the image forming apparatus 100 based on the transmitted result of processing the pop-up.

When the control unit 110 requests the user terminal 200 to display a pop-up corresponding to an event that occurred during an operation in the image forming apparatus 100, the pop-up is controlled in the same manner as the pop-up control in the user interface device 130, as described above. That is, the user terminal 200 generates and displays a requested pop-up, and then, receives an input with respect to the pop-up from the user. Afterwards, the user terminal 200 determines a result of processing the pop-up, and transmits the result of processing the pop-up to the control unit 110 of the image forming apparatus 100.

The user terminal 200 may include all hardware and software that are included in the user interface device 130 of the image forming apparatus 100 so that the same user interface screen as the user interface screen displayed on the user interface unit 132 of the image forming apparatus 100 is displayed on the user interface unit 232 of the user terminal 200. That is, the user terminal 200 may include the user interface unit 232 that displays a user interface screen and receives an input from the user, a process that includes a pop-up handler module, a UI screen configuration module, and a UI input discrimination module, and a memory that stores an operating system, various programs and data. Also, the user terminal 200 may include the communication interface 120 to exchange data with the image forming apparatus 100. The user terminal 200 displays a same user interface screen as that of the user interface device 130, and thus, may also display the same type and shape pop-up.

When the control unit 110 of the image forming apparatus 100 requests both the user interface device 130 and the user terminal 200 to display a pop-up corresponding to an event that occurred in the image forming apparatus 100, an operation is performed according to a pop-up processing result first arrived from the user interface device 130 or the user terminal 200. A result of processing the pop-up transmitted afterwards to the control unit 110 of the image forming apparatus 100 may be disregarded. Hereinafter, a process of controlling a pop-up in the image forming apparatus 100 and the user terminal 200 will be described.

Figure 4:
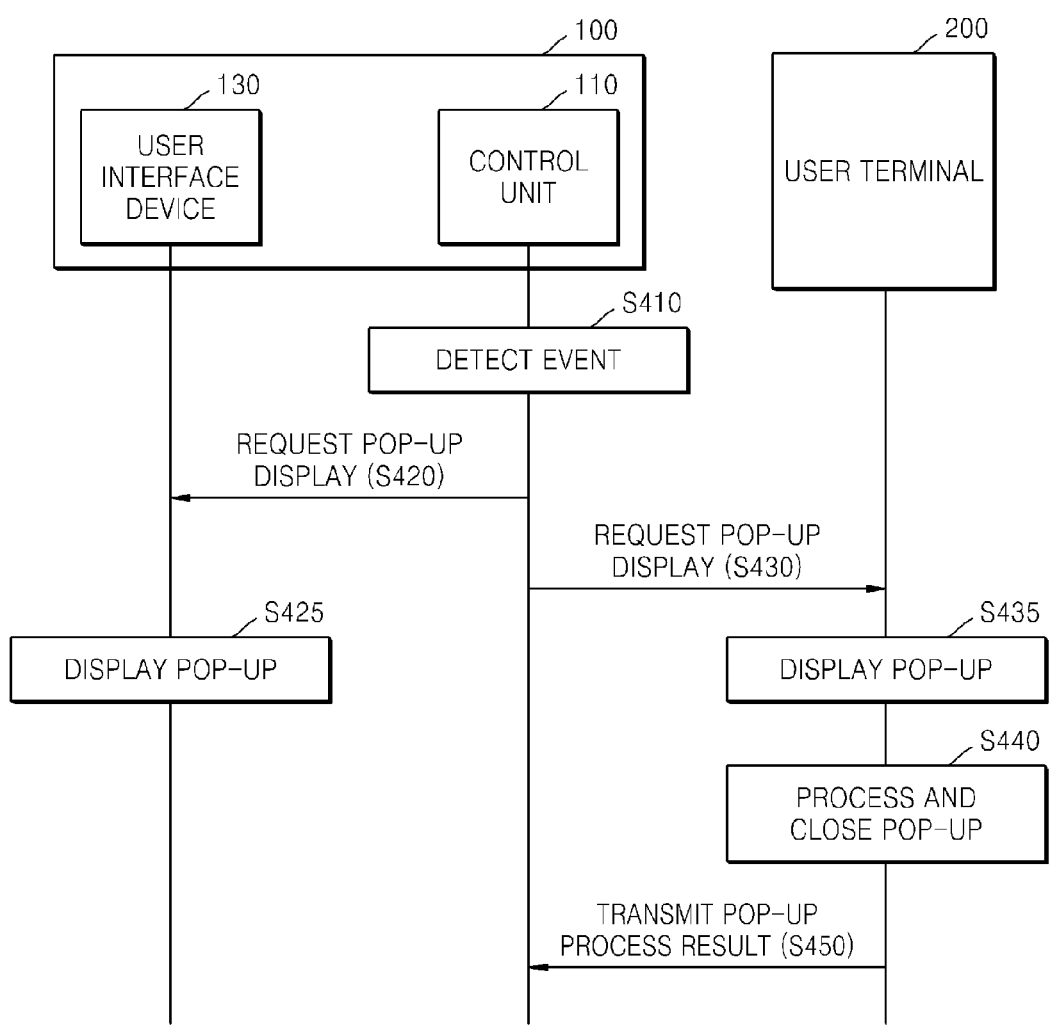
FIG. 4 is a block diagram for explaining a closing process of a pop-up by processing the pop-up at a user terminal after a request of displaying a pop-up occurs in the image forming apparatus.

FIG. 4 is a block diagram for explaining a closing process of a pop-up by processing a pop-up at the user terminal 200 after a request of displaying a pop-up occurs in the image forming apparatus 100. FIG. 4 shows a case when a pop-up closes after normally processing the pop-up by receiving an input about the pop-up from the user.

The control unit 110 of the image forming apparatus 100 may detect an event that occurs in the image forming apparatus 100 (S410). The event may occur during an operation of the image forming apparatus 100.

The control unit 110 of the image forming apparatus 100 may request the user interface device 130 to display a pop-up corresponding to the detected event (S420). The user interface device 130 may display a pop-up corresponding to the detected event (S425). Also, the control unit 110 of the image forming apparatus 100 may request the user terminal 200 to display a pop-up corresponding to the detected event (S430). The user terminal 200 may display a pop-up corresponding to the detected event (S435). The image forming apparatus 100 may request both the user interface device 130 and the user terminal 200 to display a pop-up corresponding to the detected event, or may request one of the user interface device 130 and the user terminal 200 to display a pop-up corresponding to the detected event.

When the pop-up corresponding to the detected event is displayed on the image forming apparatus 100, the pop-up may be processed by receiving a command with respect to the pop-up displayed on the user terminal 200 from the user, and then, pop-up may close (S440).

The user terminal 200 may transmit the result of processing the pop-up to the image forming apparatus 100 (S450).

Figure 5:
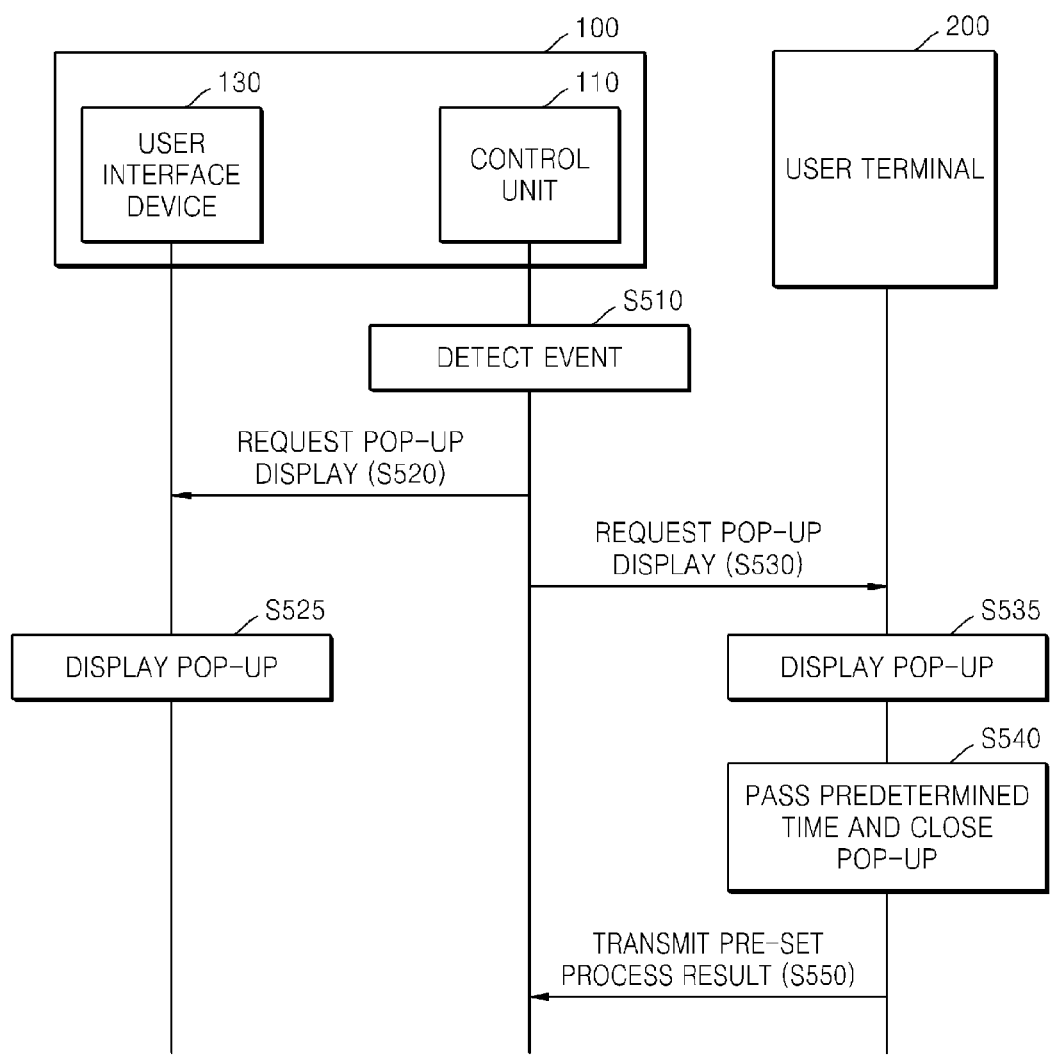
FIG. 5 is a block diagram for explaining a closing process of a pop-up after a predetermined time lapse measured by a timer in a user terminal after a request of displaying a pop-up occurs in the image forming apparatus.

FIG. 5 is a block diagram for explaining a closing process of a pop-up after a predetermined time lapse measured by a timer in the user terminal 200 after a request of displaying a pop-up occurs in the image forming apparatus 100. FIG. 5 shows a case when a pop-up closes when a time lapse measured by the user terminal 200 has passed a predetermined set time and there is no input with respect to the pop-up from the user.

The control unit 110 of the image forming apparatus 100 may detect an event that occurs in the image forming apparatus 100 (S510).

The control unit 110 of the image forming apparatus 100 may request the user interface device 130 to display a pop-up corresponding to the detected event (S520). The user interface device 130 may display a pop-up corresponding to the detected event (S525). Also, the control unit 110 of the image forming apparatus 100 may request the user terminal 200 to display a pop-up corresponding to the detected event (S530). The user terminal 200 may display a pop-up corresponding to the detected event (S535). The image forming apparatus 100 may request both the user interface device 130 and the user terminal 200 to display a pop-up corresponding to the detected event, or may request one of the user interface device 130 and the user terminal 200 to display a pop-up corresponding to the detected event.

When a time lapse until a predetermined set time, at which the pop-up is forcedly closed in the user terminal 200, is measured, if there is no input to the user terminal 200 from the user for the predetermined set time, a pop-up displayed on the user terminal 200 may close (S540). However, if the closing process of the pop-up is performed due to no input from the user for the predetermined set time, a pre-set processing result with respect to the pop-up may be transmitted to the image forming apparatus 100 (S550).

Figure 6:
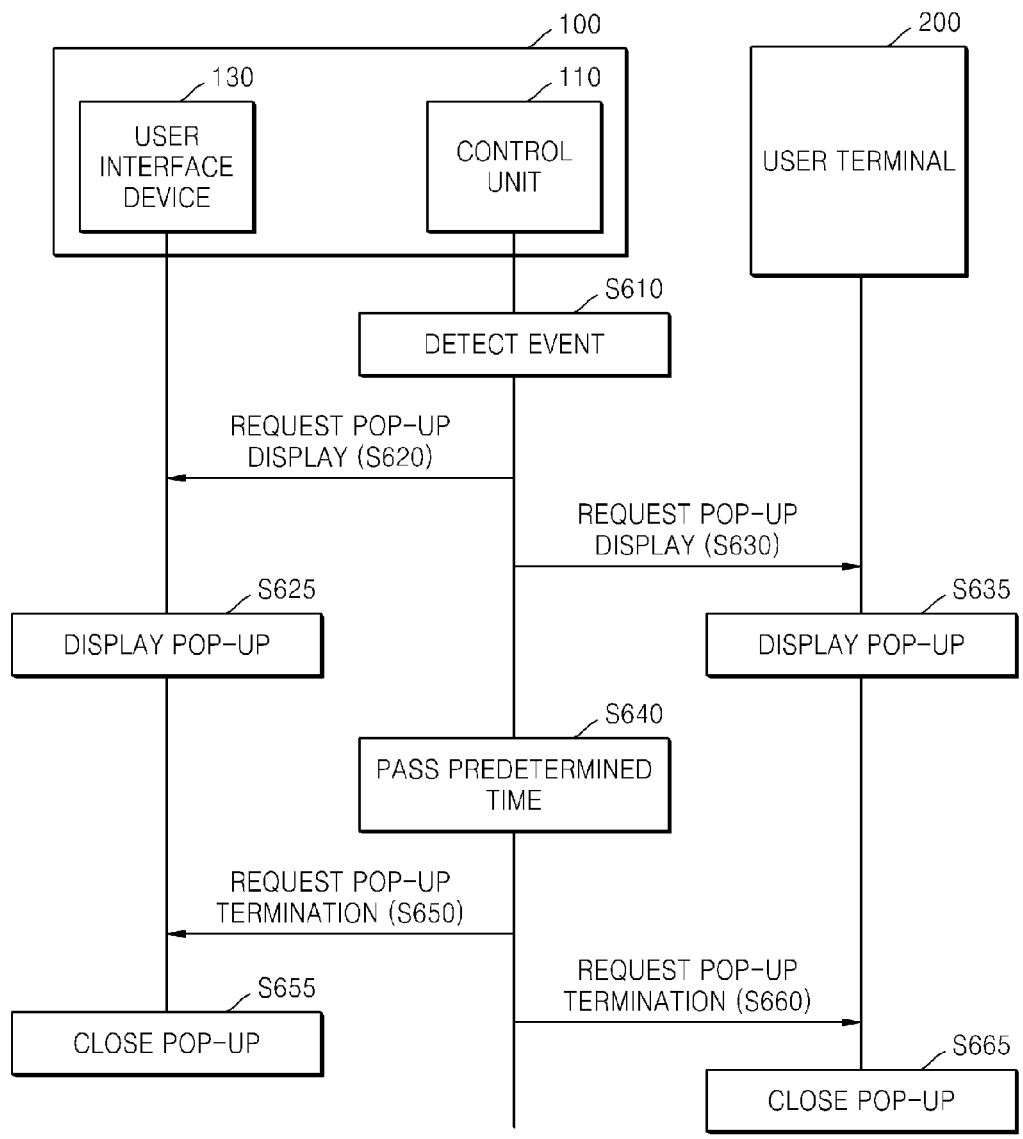
FIG. 6 is a block diagram for explaining a closing process of a pop-up after a lapse of time by a timer in an image forming apparatus after a request of displaying a pop-up occurs in the image forming apparatus.

FIG. 6 is a block diagram for explaining a closing process of a pop-up after a predetermined time lapse measured by a timer in the image forming apparatus 100 after a request of displaying a pop-up occurs in the image forming apparatus 100. FIG. 6 shows a case of closing a pop-up when a time lapse measured by the control unit 110 of the image forming apparatus 100 has passed a predetermined set time and there is no input with respect to the pop-up from the user.

The control unit 110 of the image forming apparatus 100 may detect an event that occurs in the image forming apparatus 100 (S610).

The control unit 110 of the image forming apparatus 100 may request the user interface device 130 to display a pop-up corresponding to the detected event (S620). The user interface device 130 may display a pop-up corresponding to the detected event (S625). Also, the control unit 110 of the image forming apparatus 100 may request the user terminal 200 to display a pop-up corresponding to the detected event (S630). The user terminal 200 may display a pop-up corresponding to the detected event (S635). The image forming apparatus 100 may request both the user interface device 130 and the user terminal 200 to display a pop-up corresponding to the detected event, or may request one of the user interface device 130 and the user terminal 200 to display a pop-up corresponding to the detected event.

The control unit 110 of the image forming apparatus 100 may measure a time lapse until a predetermined set time at which the pop-up is forcedly closed (S640). If there is no input for the predetermined set time, the control unit 110 of the image forming apparatus 100 may request the user interface device 130 to terminate the pop-up (S650). According to the pop-up termination request, the pop-up displayed on the user interface device 130 may close (S655). If there is no input from the user until the predetermined set time is passed, at which the pop-up is forcedly closed, the control unit 110 of the image forming apparatus 100 may request the user terminal 200 to terminate the pop-up (S660). According to the pop-up termination request, the pop-up displayed on the user terminal 200 may close (S665).

As described with reference to FIGS. 4 through 6, the pop-up displayed on the user interface device 130 of the image forming apparatus 100 and the pop-up displayed on the user terminal 200 are closed if there is an input from the user for processing the pop-up within a predetermined set time or, although there is no input, the pop-up is closed when the predetermined set time is passed. Also, the measurement of the time lapse until the predetermined set time, at which the pop-up is forcedly closed, may be performed by the user interface device 130 of the image forming apparatus 100 and the user terminal 200 that respectively display the pop-up, or may be performed by the control unit 110 of the image forming apparatus 100 that detects an event and requests to display a pop-up corresponding to the detected event.

As described with reference to FIGS. 5 and 6, the pop-up may close when the predetermined set time has passed although there is no input from the user. In the case of the user terminal 200, an interruption may occur due to an inherent function of the user terminal 200. However, while the interruption occurs, the pop-up may not be processed. Thus, when the predetermined set time is passed, the pop-up may be terminated and extinct. In this case, in order to compensate for processing the pop-up, a renewal of the timer for maintaining the pop-up is needed. Hereinafter, with reference to FIGS. 7 and 8, processes of maintaining a pop-up are described for two cases: the first case, when the measurement of a time lapse to the predetermined set time, at which the pop-up is forcedly closed, is performed in the user interface device 130 of the image forming apparatus 100 and the user terminal 200; the second case, when the measurement of a time elapse is performed in the user terminal 200.

Figure 7:
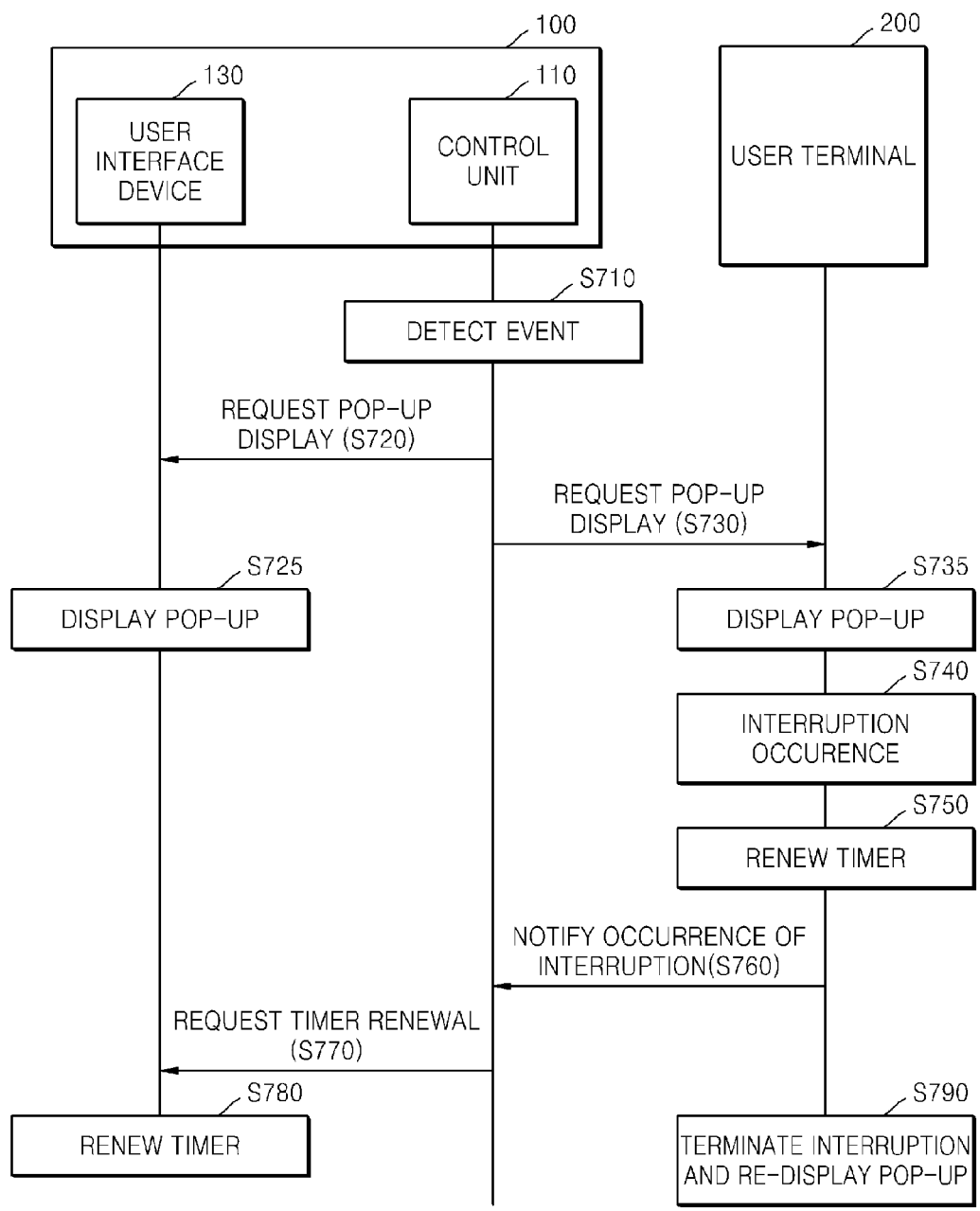
FIG. 7 is a block diagram for explaining a renewing process of a timer in a user terminal and a user interface device to maintain a pop-up when an interruption occurs in the user terminal.

FIG. 7 is a block diagram for explaining a renewing process of a timer in the user terminal 200 and the user interface device 130 to maintain a pop-up when an interruption occurs in the user terminal 200. That is, a method of maintaining a pop-up is described when the measurement of the time lapse until a predetermined set time, at which the pop-up is forcedly closed, is performed in the user interface device 130 of the image forming apparatus 100 and the user terminal 200 that respectively display a pop-up. In order to measure a time lapse until a predetermined set time, at which the pop-up is forcedly closed, the user interface device 130 of the image forming apparatus 100 and the user terminal 200 may include an additional timer or may use a real time clock (RTC) that is included in the image forming apparatus 100 and the user terminal 200, respectively.

The control unit 110 of the image forming apparatus 100 may detect an event that occurs in the image forming apparatus 100 (S710).

The control unit 110 of the image forming apparatus 100 may request the user interface device 130 to display a pop-up corresponding to the detected event (S720). The user interface device 130 may display a pop-up corresponding to the detected event (S725). Also, the control unit 110 of the image forming apparatus 100 may request the user terminal 200 to display a pop-up corresponding to the detected event (S730). The user terminal 200 may display a pop-up corresponding to the detected event (S735). The image forming apparatus 100 may request both the user interface device 130 and the user terminal 200 to display a pop-up corresponding to the detected event, or may request only one of the user interface device 130 and the user terminal 200 to display a pop-up corresponding to the detected event.

An interruption may occur on the user terminal 200 while displaying a pop-up on the user terminal 200 (S740). The interruption may be processed by an interruption handler module in a processor of the user terminal 200. When the user terminal 200 is a smartphone, the interruption may be a phone call from an external device. That is, when a phone call is received from another person while displaying a pop-up on a user interface screen of the user terminal 200, the pop-up is not seen but information related to the phone call from the other person is displayed on the user interface screen. Since the pop-up is not displayed on the user interface screen, the user may not process an operation related to the pop-up, and when the phone call is over, the pop-up is terminated due to the fact that the predetermined set time has passed, and accordingly, the image forming apparatus 100 may process the event in an undesired direction.

In order to address this problem, the user terminal 200 may maintain the pop-up. For example, the user terminal 200 may renew a measured time lapse not to pass the predetermined set time, at which the pop-up is forcedly closed (S750).

Also, when the pop-up corresponding to the detected event is displayed on the user interface device 130 of the image forming apparatus 100 and a time lapse until the predetermined set time, at which the pop-up displayed on the user interface device 130 is forcedly closed, is additionally measured, the user terminal 200 may transmit to the image forming apparatus 100 the occurrence of an event in the user terminal 200 so that the user interface device 130 may renew the measured time lapse (S760).

When the control unit 110 of the image forming apparatus 100 receives an occurrence of an interruption from the user terminal 200, the control unit 110 of the image forming apparatus 100 may request the user interface device 130 to renew the measured time lapse so that measured time lapse does not pass the predetermined set time at which the pop-up is forcedly closed (S770). According to the renewal request of the timer by the control unit 110, the user interface device 130 may renew the measured time lapse (780).

When the interruption that occurred in the user terminal 200 is terminated, the pop-up may be re-displayed (S790). Accordingly, the user may process the pop-up that is displayed on the user terminal 200.

Figure 8:
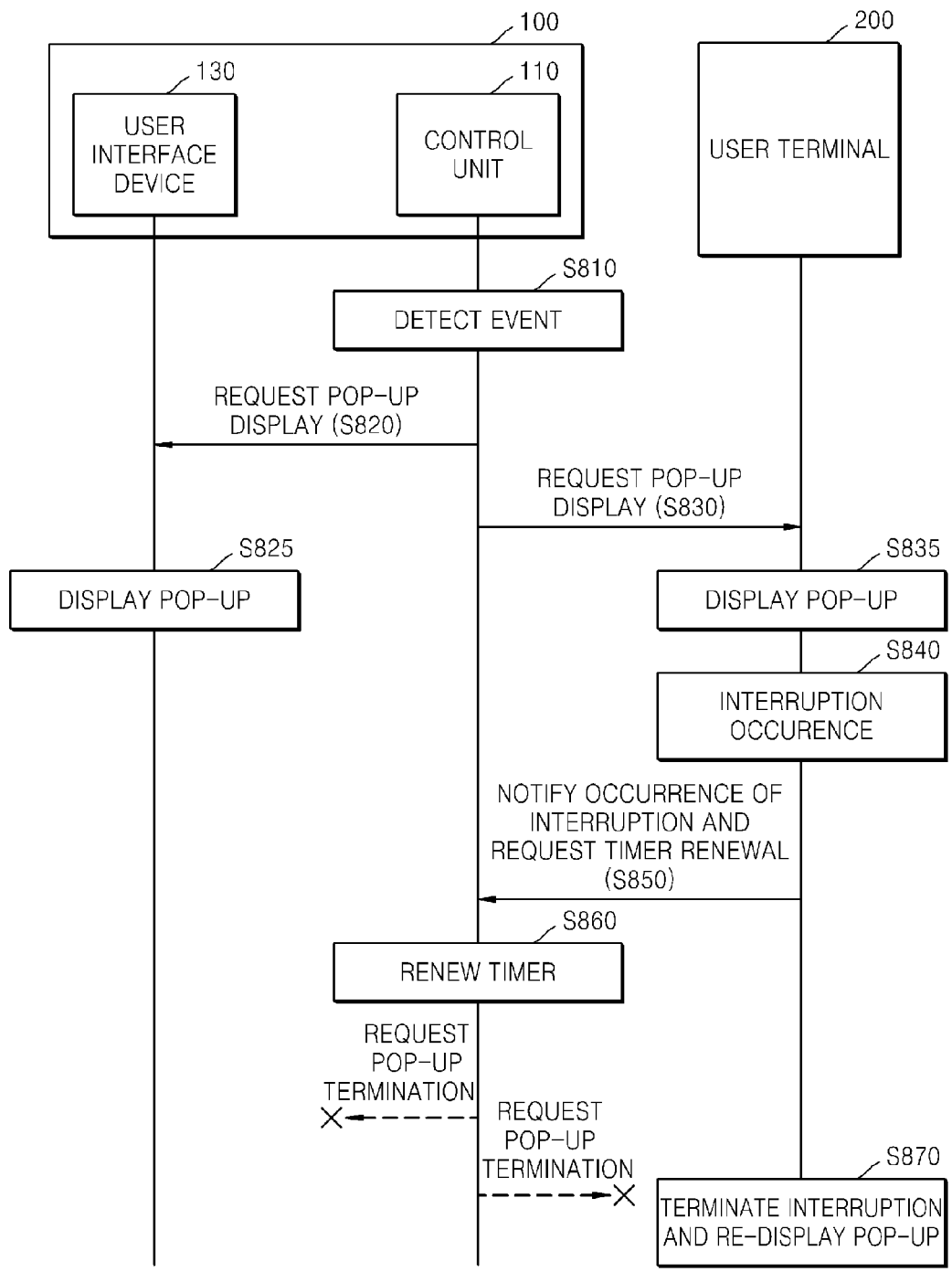
FIG. 8 is a block diagram for explaining a renewing process of a timer in an image forming apparatus to maintain a pop-up when an interruption occurs in the user terminal.

FIG. 8 is a block diagram for explaining a renewing process of a timer in the image forming apparatus 100 to maintain a pop-up when an interruption occurs in the user terminal 200. That is, FIG. 8 shows a process of maintaining a pop-up in the case when the measurement of the time lapse until the predetermined set time, at which the pop-up is forcedly closed, is performed by the control unit 110 of the image forming apparatus 100 that detects an event and requests to display a pop-up corresponding to a detected event. In order to measure a time lapse until the predetermined set time at which the pop-up is forcedly closed, the control unit 110 of the image forming apparatus 100 may include an additional timer or may use an RTC included in the image forming apparatus 100.

The control unit 110 of the image forming apparatus 100 may detect an event that occurred in the image forming apparatus 100 (S810).

The control unit 110 of the image forming apparatus 100 may request the user interface device 130 to display a pop-up corresponding to the detected event (S820). The user interface device 130 may display a pop-up corresponding to the detected event (S825). The control unit 110 of the image forming apparatus 100 may request the user terminal 200 to display a pop-up corresponding to the detected event (S830). The user terminal 200 may display a pop-up corresponding to the detected event (S835). The image forming apparatus 100 may request both the user interface device 130 and the user terminal 200 to display a pop-up corresponding to the detected event, or may request only one of the user interface device 130 and the user terminal 200 to display a pop-up corresponding to the detected event.

An interruption may occur on the user terminal 200 while displaying a pop-up on the user terminal 200 (S840). Since the control unit 110 of the image forming apparatus 100 measures a time lapse until the predetermined set time at which the pop-up is forcedly closed, in order to maintain the pop-up on the user terminal 200, the user terminal 200 may notify the occurrence of an interruption on the user terminal 200 and may request the control unit 110 of the image forming apparatus 100 to renew the measured time lapse so that the predetermined set time at which the pop-up is forcedly closed is not passed (S850).

When the control unit 110 of the image forming apparatus 100 receives the notification of an interruption and the request of a renewal of the measured time lapse, the control unit 110 of the image forming apparatus 100 may renew the measured time lapse so that the predetermined set time at which the pop-up is forcedly closed is not passed (S860). Thus, the transmission of a pop-up termination request that could have been transmitted to the user interface device 130 and the user terminal 200 after the predetermined set time may be prevented.

When the interruption the occurred on the user terminal 200 is terminated, the pop-up may be re-displayed (S870). Thus, the user may process the pop-up displayed on the user terminal 200.

Figure 9:
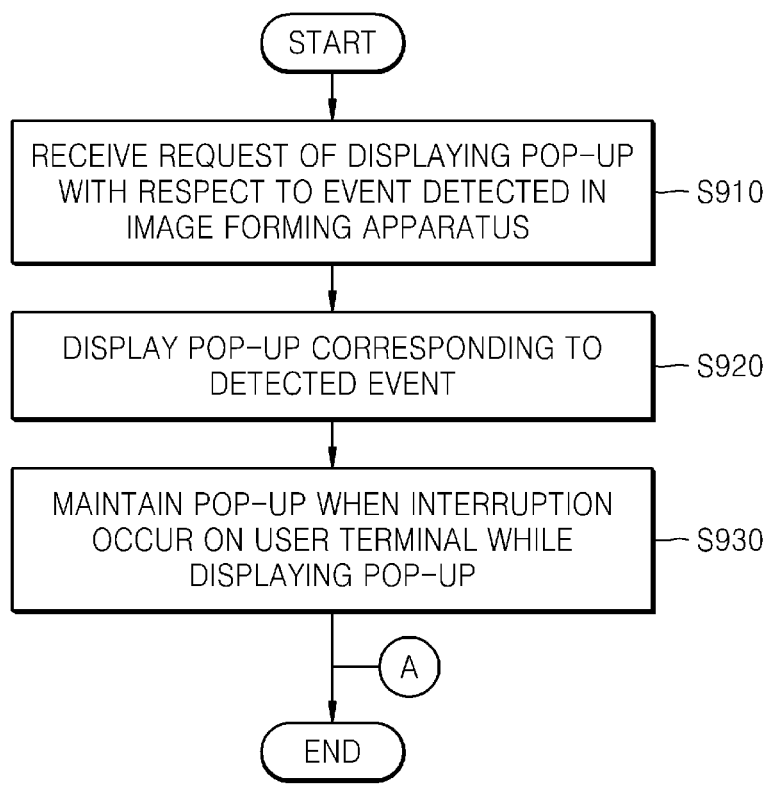
FIGS. 9 through 11 are flowcharts of a method of controlling a pop-up, according to an embodiment.
Figure 10:
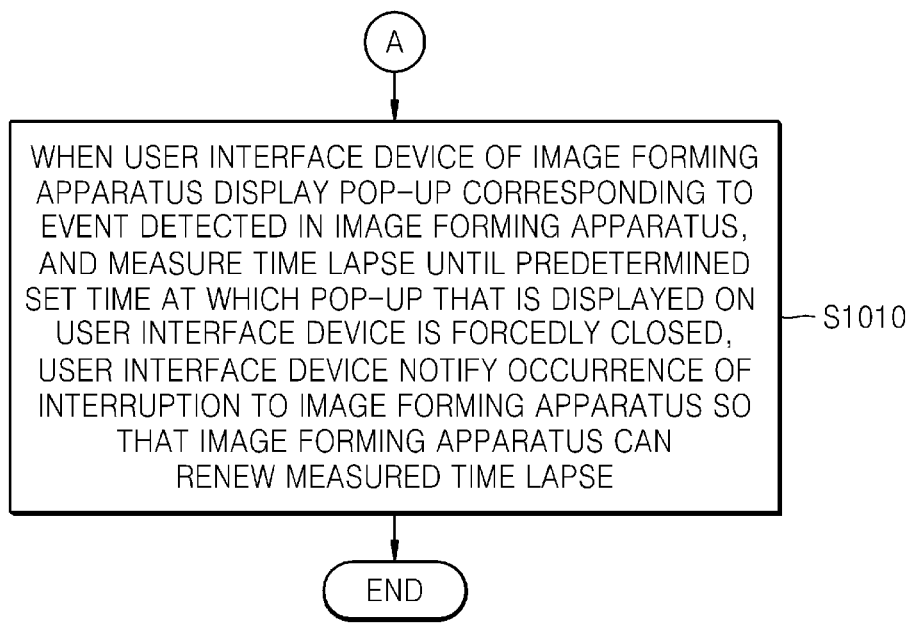
Figure 11:
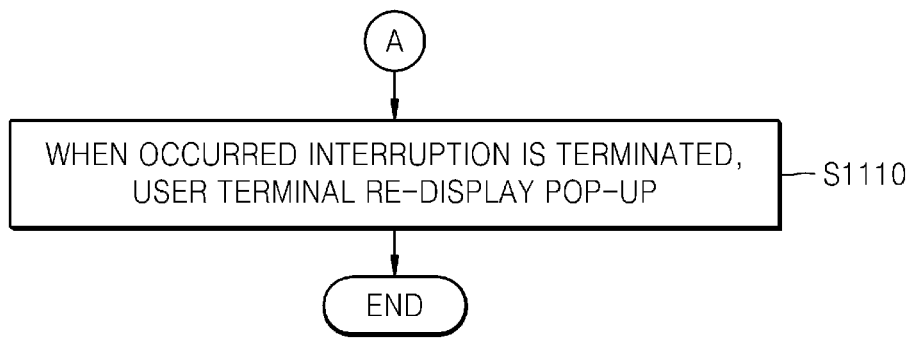

FIGS. 9 through 11 are flowcharts of a method of controlling a pop-up, according to an embodiment. Even though some descriptions of the method are omitted below, the descriptions of the method above may be applied to the method of controlling a pop-up, according to an embodiment.

The user terminal 200 that may communicate with the image forming apparatus 100 may receive a request from the image forming apparatus 100 to display an event detected in the image forming apparatus 100 (S910).

The user terminal 200 may display a pop-up corresponding to the event detected in the image forming apparatus 100 (S920).

The user terminal 200 may maintain the pop-up when an interruption occurs in the user terminal 200 while displaying the pop-up (S930). That is, due to the occurrence of the interruption, the user may not process the pop-up, and in order to prevent the termination of the pop-up by passing a predetermined set time at which the pop-up is forcedly closed, the user terminal 200 may maintain the pop-up by renewing the time lapse until the predetermined set time at which the pop-up is forcedly closed. If the time lapse until the predetermined set time, at which the pop-up is forcedly closed, is measured in the user terminal 200, the pop-up may be held by renewing the measured time lapse in the user terminal 200. Alternatively, if the control unit 110 of the image forming apparatus 100 measures the time lapse until the predetermined set time at which the pop-up is forcedly closed, the pop-up may be held by notifying an occurrence of an interruption to the control unit 110 of the image forming apparatus 100 so that the control unit 110 may renew the measured time lapse.

When the user interface device 130 of the image forming apparatus 100 displays a pop-up corresponding to an event detected in the image forming apparatus 100, and measures a time lapse until the predetermined set time at which the pop-up that is displayed on the user interface device 130 is forcedly closed, the user interface device 130 may notify the occurrence of an interruption to the image forming apparatus 100 so that the image forming apparatus 100 may renew the measured time lapse (S1010).

When the occurred interruption is terminated, the user terminal 200 may re-display the held pop-up (S1110).

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

When a pop-up is generated in the user terminal that is able to communicate with an image forming apparatus while an operation of the image forming apparatus is controlled at the user terminal, the control of the pop-up may be improved not to be affected by an interruption that occurs in the user terminal.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A method of controlling a pop-up by using a user terminal that is able to communicate with an image forming apparatus, the method comprising:
receiving a request of displaying the pop-up for an event detected while performing an operation of the image forming apparatus in the image forming apparatus;
displaying the pop-up corresponding to the detected event; and
maintaining the pop-up so that the pop-up is not terminated when an interruption occurs due to a function of the user terminal in the user terminal while displaying the pop-up,
wherein the maintaining of the pop-up comprises maintaining the pop-up by renewing a measured time lapse until a predetermined set time at which the pop-up is forcedly closed, and
wherein the maintaining of the pop-up comprises maintaining the pop-up by notifying an occurrence of the interruption to the image forming apparatus so that a control unit of the image forming apparatus renews the measured time lapse when the time lapse, until the predetermined set time, is measured in the control unit of the image forming apparatus.

2. The method of claim 1, wherein the pop-up is re-displayed when the occurred interruption is terminated.

3. At least one non-transitory computer readable medium storing computer readable instructions which when executed control at least one processor to implement a method of claim 1.

4. A user terminal that is able to communicate with an image forming apparatus, the user terminal comprising:
a communication interface through which a request to display a pop-up for an event detected while performing an operation of the image forming apparatus in the image forming apparatus is received;
a user interface on which the pop-up corresponding to the detected event is displayed; and
a processor that maintains the pop-up so that the pop-up is not terminated when an interruption occurs due to a function of the user terminal in the user terminal while displaying the pop-up,
wherein the processor maintains the pop-up by renewing a time lapse to a predetermined set time at which the pop-up is forcedly closed, and
wherein the processor maintains the pop-up by notifying the occurrence of the interruption to the image forming apparatus through the communication interface so that a controller of the image forming apparatus renews a measured time lapse when the time lapse, until the predetermined set time, is measured in the controller of the image forming apparatus.

5. The user terminal of claim 4, wherein the user interface re-displays the pop-up when the occurred interruption is terminated.

6. An image forming apparatus that is able to communicate with a user terminal, the image forming apparatus comprising:
a controller that detects an event that occurs while performing an operation in the image forming apparatus, and requests the user terminal and a user interface device of the image forming apparatus to display a pop-up corresponding to the detected event; and
the user interface device that displays the pop-up corresponding to the detected event,
wherein the image forming apparatus maintains the pop-up of each of the user terminal and the user interface device so that the pop-up of each of the user terminal and the user interface device is not terminated by renewing a measured time lapse to a predetermined set time at which the pop-up of each of the user terminal and the user interface device is forcedly closed when an interruption occurs due to a function of the user terminal in the user terminal while displaying the pop-up corresponding to the detected event, and
wherein the controller maintains the pop-up of each of the user terminal and the user interface device by renewing the measured time lapse when the occurrence of the interruption is notified to the image forming apparatus, in the case when the time lapse, until the predetermined set time is measured in the controller of the image forming apparatus.

* * * * *